Patented Aug. 30, 1949

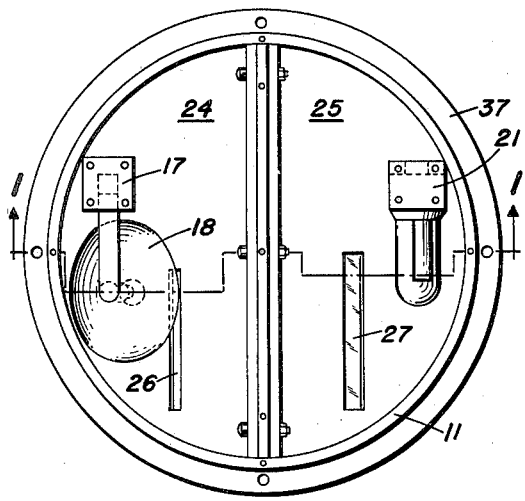

2,480,134

UNITED STATES PATENT OFFICE 2,480,134

ELECTRONIC COMPASS RELAY
(REFLECTOR TYPE)

Robert C. Harrington, Jr., Kingsport, Tenn.

Application November 19, 1948, Serial No. 61,091

5 Claims. (Cl. 250—231)

(Granted under the act of March 3, 1883, as amended April 30, 1928; 370 O. G. 757)

This invention relates to an electronic compass control system and more particularly to an electronic compass control system of the reflection type by which other devices may be automatically actuated whenever the compass proper indicates the compass support is out of alignment with a reference direction.

The present system is particularly applicable for automatic steering of a mobile body, such as an aircraft, water craft, or land vehicle, the compass control mechanism effecting the desired alteration without placing any resistance whatever on the free movement of the compass. It is especially applicable in connection with positional instruments capable of producing only an extremely weak torque, such as compasses, gyroscopes, or other similar instruments, the proper operation of which would be impaired if an appreciable load were put thereon.

Accordingly, it is an object of the present invention to provide a control system having electronic means responsive to the movement of the positional instrument for producing an output signal for controlling the mechanism to be oriented.

Another object is to provide a control system having photosensitive means, responsive to light variations due to movement of the positional instrument, for producing a signal to be used to automatically determine the operation of the mechanism to be controlled.

Other objects and advantages of the invention will become more fully apparent from the following description taken in connection with the annexed drawings, which illustrates a preferred embodiment, and wherein:

Fig. 1 is a section of the mechanism of the present invention taken on the line 1—1 of Fig. 2, the said mechanism being shown connected to the other elements of the system.

Fig. 2 shows a section of the mechanism taken on the line 2—2 of Fig. 1.

Fig. 3 is a sectional view taken along line 3—3 of Fig. 1; and

Fig. 4 shows a section taken along the line 4—4 of Fig. 1.

Referring now to the drawings, wherein like reference characters designate like or corresponding parts throughout the several views, there is shown in Fig. 1 a tubular housing 11 of non-magnetic material, preferably aluminum, provided with a partition 12 having a pair of slots 13 therein, slots 13 being sealed by windows 14 held in place by flanges 15.

The upper portion of the housing 11 comprises a cover plate 16 to which is secured a reflector mounting bracket 17 having a reflector 18 mounted thereon, reflector 18 being designed to reflect parallel rays of light from light source 19. Also secured to cover plate 16 is a mounting bracket 21 having a phototube 22, or other light sensitive device, mounted thereon.

Within housing 11 between plate 16 and partition 12 is a light tight dividing partition 23 to which are secured a pair of masking plates 24 and 25. Masking plate 24 is mounted in the portion containing light source 19 and has a slit 26 therein which serves to transmit a narrow beam of light consisting of parallel light rays. Masking plate 25 is mounted in the portion containing phototube 22 and supports a lens 27 which serves to focus any light rays directed thereat on the sensitive elements of phototube 22.

The lower portion of housing 11 comprises a compass card chamber 28 in which is mounted a vertical pivot 29 which pivotally supports compass card 31, said card being provided with needle magnets 32 to produce the required compass effect and quadrature spaced tabs 33 for damping. The outer margin 34 and the area within spiral 35, developed centrally of compass card 31 is coated with or formed of opaque non-reflecting material, while the area 36 between spiral 35 and outer margin 34 is coated with or formed of light reflecting material, for example silvered. Chamber 28 is hermetically sealed and may be filled, or partially filled, with some satisfactory transparent liquid to damp the motion of card 31. Housing 11 is provided with a mounting flange 37 so that the entire device may be mounted in a gimbal.

Extending from the control elements of phototube 22 through cover plate 16 are a pair of conductors 38 and 39 which are connected to an amplifier 41 through a battery 42 in a conventional manner. The output of amplifier 41 is fed to a controlled mechanism 43, which may be any mechanical or electrical device for effecting a desired orientation.

In operation, light from source 19 is reflected from reflector 18 as parallel rays through the slit 26 down to compass card 31, and is reflected from area 36 of card 31 to lens 27 where it is focused on phototube 22. As the area within spiral 35 is non-reflecting, any rotational movement of card 31 relative to slit 26 will vary the width and quanta of the light beam reaching lens 27 and phototube 22 by blanking out a portion thereof, and thereby vary the response of phototube 22. The varying amount of light received by phototube 22 is transformed into electrical impulses which are amplified by amplifier 41 and then fed to the controlled mechanism 43 which may be an automatic steering mechanism. Thus, if the heading of a ship, or any other movable object on which the invention is mounted, is altered, compass card 31 will turn with respect to the ship and thereby vary the quanta of light reaching phototube 22. As spiral 35 moves in relation to slit 26, it operates in effect as a linear cam blanking out a portion of the beam reflected from card 31 in a linear functional manner. Any other desired functional variation may be achieved by altering the configuration of the blanking design on card 31, but it is preferable that this variation be linear in order to more accurately control the operation of mechanism 43.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

The invention described herein may be manufactured and used by or for the Government of the United States of America for governmental purposes without the payment of any royalties thereon or therefor.

What is claimed is:

1. In an electronic control system, the combination comprising: a housing; a source of light within said housing; means for reflecting a portion of said light in parallel rays; a plate having a narrow slit therein mounted in the path of said rays for producing a narrow beam; a rotatable compass card positioned in the path of said beam, said card having a light reflecting portion and a light blanking spiral portion for varying the quanta of light from said beam reflected by said card as a linear function of angular displacement of said card; a photo-emissive tube within said housing; a lens mounted in the path of the reflected light for converging said reflected light on said tube; and means for amplifying the output of said tube, said means being adapted to be connected to a controllable device.

2. In an electronic control system, the combination comprising: a source of light; means for forming a narrow beam of light from said source; a rotatable compass card positioned in the path of said beam, said card having a light reflecting portion and a light blanking spiral portion for varying the quanta of light from said beam reflected by said card as a linear function of angular displacement of said card; light sensitive means positioned in the path of the reflected light; and means for amplifying the output of said light sensitive means.

3. The combination according to claim 2, and means positioned between said card and said light sensitive means for converging said reflected light on said light sensitive means.

4. In an electronic control system, the combination comprising: a source of light; a rotatable compass card positioned in the path of the light, said card having a light reflecting portion and a light blanking spiral portion for varying the quanta of light reflected by said card as a linear function of angular displacement of said card; and light sensitive means positioned in the path of the reflected light.

5. In combination with a controllable device, a source of light, a rotatable compass card positioned in the path of said light for reflecting a portion thereof, said card having a light blanking portion thereon for varying the quanta of light reflected by said card in accordance with the angular displacement thereof, and light sensitive means positioned in the path of the reflected light, said means being connected to said device.

ROBERT C. HARRINGTON, Jr.

No references cited.